US012503613B2

United States Patent
Sente

(10) Patent No.: US 12,503,613 B2
(45) Date of Patent: Dec. 23, 2025

(54) DEINKING METHOD, DEINKING AGENT FOR USE IN SAID DEINKING METHOD, AND PLASTIC SUBSTRATE RECOVERY METHOD USING SAME

(71) Applicant: DIC Corporation, Tokyo (JP)

(72) Inventor: Yasuhiro Sente, Tokyo (JP)

(73) Assignee: DIC CORPORATION, Tokyo (JP)

( * ) Notice: Subject to any disclaimer, the term of this patent is extended or adjusted under 35 U.S.C. 154(b) by 294 days.

(21) Appl. No.: 18/277,264

(22) PCT Filed: Feb. 24, 2022

(86) PCT No.: PCT/JP2022/007444
§ 371 (c)(1),
(2) Date: Aug. 15, 2023

(87) PCT Pub. No.: WO2022/190871
PCT Pub. Date: Sep. 15, 2022

(65) Prior Publication Data
US 2024/0124723 A1 Apr. 18, 2024

(30) Foreign Application Priority Data
Mar. 11, 2021 (JP) .................................. 2021-039114

(51) Int. Cl.
| | | |
|---|---|---|
| C09D 9/00 | (2006.01) | |
| B29B 17/02 | (2006.01) | |
| C09D 9/04 | (2006.01) | |
| B29B 17/04 | (2006.01) | |

(52) U.S. Cl.
CPC ............. *C09D 9/04* (2013.01); *B29B 17/02* (2013.01); *B29B 2017/0468* (2013.01)

(58) Field of Classification Search
CPC ... C09D 9/04; B29B 17/02; B29B 2017/0468; B29B 17/04; B29B 2017/0203; B29B 2017/0296; B29L 2009/00; Y02W 30/62
USPC ........................................................ 510/174
See application file for complete search history.

(56) References Cited

U.S. PATENT DOCUMENTS

| | | |
|---|---|---|
| 2002/0103266 A1 | 8/2002 | Na et al. |
| 2019/0390336 A1 | 12/2019 | Krücken et al. |
| 2023/0234263 A1 | 7/2023 | Sente et al. |

FOREIGN PATENT DOCUMENTS

| | | | | |
|---|---|---|---|---|
| CN | 101318361 A | 12/2008 | | |
| CN | 203854114 U | 10/2014 | | |
| CN | 106398374 A | * 2/2017 | ............... | C09D 9/04 |
| CN | 109280418 A | * 1/2019 | ............... | C09D 9/04 |
| CN | 109504157 A | 3/2019 | | |
| CN | 110616006 A | * 12/2019 | ............... | C09D 9/04 |
| JP | 50-38777 A | 4/1975 | | |
| JP | 6-220245 A | 8/1994 | | |
| JP | 8-123043 A | 5/1996 | | |
| JP | 8-164524 A | 6/1996 | | |
| JP | 8-245989 A | 9/1996 | | |
| JP | 9-87668 A | 3/1997 | | |
| JP | 10-280179 A | 10/1998 | | |
| JP | 10-292138 A | 11/1998 | | |
| JP | 11-206883 A | 8/1999 | | |
| JP | 2002-179955 A | 6/2002 | | |
| JP | 2006-83351 A | 3/2006 | | |
| JP | 2016-153176 A | 8/2016 | | |
| JP | 2020-506290 A | 2/2020 | | |
| JP | 2020-175620 A | 10/2020 | | |
| JP | 2021-160350 A | 10/2021 | | |
| WO | 2021/230033 A1 | 11/2021 | | |

OTHER PUBLICATIONS

International Search Report dated Apr. 19, 2022, issued in counterpart International Application No. PCT/JP2022/007444 (3 pages).
Notice of Reasons for Refusal dated Oct. 11, 2022, issued in counterpart JP Patent Application No. 2022-547724, w/English translation (10 pages).

* cited by examiner

*Primary Examiner* — Eisa B Elhilo
(74) *Attorney, Agent, or Firm* — WHDA, LLP

(57) ABSTRACT

The invention provides a deinking method including a step of peeling off and removing, from a plastic substrate having an ink layer, the ink layer by using a deinking agent that contains (a) 20 mass % or more of a water-soluble solvent and (b) 0.1 mass % to 10 mass % of an inorganic base. According to the invention, it is possible to provide a deinking method that can easily peel off an ink layer printed on a plastic substrate, a deinking agent that can be used in the deinking method, and a plastic substrate recovery method using the same.

6 Claims, No Drawings

DEINKING METHOD, DEINKING AGENT FOR USE IN SAID DEINKING METHOD, AND PLASTIC SUBSTRATE RECOVERY METHOD USING SAME

TECHNICAL FIELD

The present invention relates to a deinking method for peeling off, from a plastic substrate provided with an ink layer, the ink layer, a deinking agent for use in the deinking method, and a plastic recovery method using the same.

BACKGROUND ART

Currently, a recycling rate for classification and recovery of plastic waste is 9% of all the manufactured plastics worldwide. Among 91% of the plastics. i.e., the waste, 12% is incinerated, and 79% is either landfilled or discharged into the environment (NPL 1). It is difficult to return a recycled plastic product to the same product from the viewpoint of cost, and basically, since the recycled plastic product is deteriorated every time it is recycled, there is no choice but to obtain a product having a lower quality. The reason why the quality of the recycled plastic deteriorates is that an ink or a pigment is mixed as impurities in the plastic. However, since the surfaces of many plastic products are subjected to printing, it is difficult to decolor the plastic products in a recycling step, and as a result, the recycled plastic products are with colors. Such recycled plastics containing a pigment, an ink, and the like are not only extremely low in commercial value due to coloring, but also are actually only plastics that are physically deteriorated due to impurities as the starting point, and there is a strong demand for a recycling method that produces high-quality recycled plastics.

In response to such a problem, PTL 1 provides an ink mainly containing a high-acid-value resin in order to peel off an ink printed on a plastic product in an alkaline solution, but does not describe remarkable deterioration of printability associated with a change in composition. PTL 2 provides a method of stirring a printed layer in a heated alkaline solution as a method of peeling off a printed layer from a plastic product, and in order to peel off the printed layer, a peeling layer made of a high-acid-value resin is essential under the printed layer. In these studies, a high-acid-value resin such as fumaric acid, phthalic acid, or maleic acid is used for an ink and/or peeling layer, and the ink and/or peeling layer is peeled off with an alkaline solution in a recycling step. However, since the alkaline solution is neutralized when the high-acid-value resin is dissolved, a large amount of the alkaline solution is required.

On the other hand, in order to dissolve a coating material or a resin film, in PTL 3, a polyoxyethylene alkyl ether is used as an additive in a 5% aqueous sodium hydroxide solution as an alkaline cleaning agent capable of cleaning a steel sheet. In addition, in PTLs 4 to 7, a cleaning liquid containing an amine compound, water, and glycol ether is used according to respective purposes. However, an ink layer printed on a target film of the present application cannot be peeled off by using the exemplified cleaning agents.

As described above, most of the cleaning agents in the related art are cleaning agents developed for dissolving a dry coating material in a pipe or dissolving an etching resist resin, are not intended to peel off the ink layer printed on the film, and do not have such an effect.

In particular, in recent years, with diversification of packaging materials, higher functionality of the packaging materials, higher adhesion of an ink film to a plastic substrate, and higher designability of a printed article have been required, and therefore, diversification of types of packaging materials and inks has progressed, and formation of multi-color or multilayer ink layers has also been generally performed. At the same time, it is more difficult to peel off the ink layers. For example, the ink can be roughly classified into a thermoplastic type ink and a thermosetting type ink depending on the type of the resin to be used. Since an ink film made of the thermosetting type ink firmly bonds to and adheres to the plastic substrate, peeling of the ink film becomes more difficult. In addition, in a case of a laminated film in which a printed layer is provided between a plurality of films (back printing), it is also necessary to separate the plurality of films in order to remove the printed layer, and therefore, peeling of the ink film becomes more difficult.

Therefore, there is a demand for a method capable of peeling off various ink films or an ink film for plastic films having various configurations.

CITATION LIST

Non Patent Literature

NPL 1: Science Advances 19 Jul. 2017: Vol. 3, no. 7, e1700782

PATENT LITERATURE

PTL 1: Japanese Patent Application No. 2020-506290
PTL 2: JPH11-206883A
PTL 3: JPH10-280179A
PTL 4: JPH08-123043A
PTL 5: JPH08-245989A
PTL 6: JPH09-087668A
PTL 7: JP2006-83351A

SUMMARY OF INVENTION

Technical Problem

An object of the invention is to provide a deinking method that can easily peel off an ink layer printed on a plastic substrate, a deinking agent that can be used in the deinking method, and a plastic substrate recovery method using the same.

Solution to Problem

That is, the invention provides a deinking method including a step of peeling off and removing, from a plastic substrate having an ink layer, the ink layer by using a deinking agent that contains (a) 20 mass % or more of a water-soluble solvent and (b) 0.1 mass % to 10 mass % of an inorganic base.

In addition, the invention provides a deinking agent for use in the deinking method described above. The deinking agent contains (a) 20 mass % or more of a water-soluble solvent and (b) 0.1 mass % to 10 mass % of an inorganic base.

In addition, the invention provides a plastic substrate recovery method including recovering the plastic substrate from which the ink layer is peeled off by the deinking method described above.

Advantageous Effects of Invention

According to the invention, it is possible to easily peel off, from a plastic substrate provided with an ink layer, the ink layer. Therefore, it is possible to easily recover the plastic substrate to which an ink does not adhere, and to improve a quality of a recycled plastic.

According to the method of the invention, the ink layer can be easily peeled off even in plastic substrates having various configurations, such as various types of ink films including a cured ink film, and a laminated film in which a printed layer is provided between a plurality of films (back printing). That is, the ink layer can be easily peeled off regardless of the type of the plastic substrate, and the film can be separated into single layers. Therefore, a recovery process of the ink layer can be easily performed.

DESCRIPTION OF EMBODIMENTS (Deinking Agent)

A deinking agent for use in the invention can easily peel off, from a plastic substrate having an ink layer, the ink layer, and contains water containing (a) 20 mass % or more of a water-soluble solvent and (b) 0.1 mass % to 10 mass % of an inorganic base and, if necessary, a surfactant. Note that the plastic substrate from which the ink layer is to be peeled off can be used for recovery, classification, and reuse, and a high-quality recycled plastic can be obtained because an ink is removed.

The water-soluble solvent (a) preferably contains one or more water-soluble alcohols or water-soluble solvents having a flash point of 21° C. or higher. When a water-soluble solvent is used as the deinking agent, hydroxide ions generated from the inorganic base contained in the deinking agent are less likely to be hydrated. Therefore, since the nucleophilic property of the hydroxide ions is increased and a reaction of peeling off the ink layer can be progressed in a hydrophobic environment, it is effective for peeling off an ink film.

The water-soluble solvent having a flash point of 21° C. or higher is preferably a water-soluble solvent among organic solvents corresponding to Class II petroleum and Class III petroleum defined in the fire service act. In addition, examples of the water-soluble alcohol include an alcohol defined in the fire service act. Specific examples thereof include 3-methoxy-3-methyl-1-butanol, diethylene glycol monobutyl ether, and ethanol. These may be used alone or in combination.

In the deinking agent, the water-soluble solvent is preferably contained in a range of 20 mass % or more. When the content of the water-soluble solvent is less than 20 mass %, it is difficult to obtain a sufficient effect in peeling off the ink layer. From the viewpoint of the peelability of the ink layer, the deinking agent preferably contains a large amount of the water-soluble solvent. Specifically, the content of the water-soluble solvent is preferably 30 mass % or more, preferably 40 mass % or more, preferably 50 mass % or more, preferably 60 mass % or more, preferably 70 mass % or more, preferably 80 mass % or more, preferably 90 mass % or more, and preferably 95 mass % or more.

The deinking agent according to the invention contains the inorganic base (b). Specific examples of the inorganic base include sodium hydroxide and potassium hydroxide, and potassium hydroxide is preferably used. The inorganic base is contained at a concentration of 0.1 wt % to 10 wt %, and more preferably at a concentration of 0.1 wt % to 5 wt % based on the total amount of the deinking agent. In addition, the pH is preferably 10 or more, more preferably 11 or more, and still more preferably 12 or more.

The deinking agent according to the invention may contain water (c). By containing water in the deinking agent, the working stability and the environmental stability of a deinking method can be improved. The content of the water is preferably 80 mass % or less based on the total amount of the deinking agent. When the content of the water exceeds 80 mass %, it is difficult to obtain a sufficient effect in peeling off the ink layer.

A ratio of the water-soluble solvent to the water can be appropriately adjusted from the viewpoints of a peeling effect and safety of the ink layer. A mass ratio is preferably in a range of water-soluble solvent:water=20:80 to 100:0. The lower limit value of a proportion of the water-soluble solvent in the total amount of the water-soluble solvent and the water is preferably 20 mass %, preferably 30 mass %, preferably 40 mass %, preferably 50 mass %, and preferably 60 mass %.

The deinking agent according to the invention may contain a surfactant (d). The surfactant is not particularly limited, and a known surfactant can be used. Examples thereof include an anionic surfactant, a nonionic surfactant, an amphoteric surfactant, and a cationic surfactant.

Examples of the nonionic surfactant can generally include a polyoxyalkylene alkyl ether, a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a sucrose fatty acid ester, a polyoxyethylene alkyl amine, a polyoxyethylene fatty acid amide, a fatty acid alkylolamide, an alkyl alkanol amide, an acetylene glycol, an oxyethylene adduct of an acetylene glycol, and a polyethylene glycol polypropylene glycol block copolymer. Among them, polyoxyethylene nonyl phenyl ether, polyoxyethylene octyl phenyl ether, polyoxyethylene dodecyl phenyl ether, polyoxyethylene alkyl ether, a polyoxyethylene fatty acid ester, a sorbitan fatty acid ester, a polyoxyethylene sorbitan fatty acid ester, a fatty acid alkylolamide, an acetylene glycol, an oxyethylene adduct of an acetylene glycol, and a polyethylene glycol polypropylene glycol block copolymer are mentioned.

In the invention, the deinking agent preferably contains a polyoxyalkylene alkyl ether-based surfactant containing at least one compound represented by Formula (1) in an amount of 0.01 wt % to 5 wt %.

$$R^1\text{---}O\text{---}[CH_2\text{---}CH(X^1)\text{---}O]n^1\text{-}H \qquad (1)$$

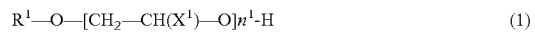

In Formula (1), $R^1$ represents a straight or branched alkyl group or alkenyl group, or an octylphenol group, $n^1$ represents an average addition mole number, and $X^1$ represents hydrogen or a short-chain alkyl group.

More preferably, in Formula (1), a straight or branched alkyl group or alkenyl group having 10 or more carbon atoms represented by $R^1$ is preferred. The more the number of carbon atoms exceeds 10, the more preferred the ink peelability is. Regarding the specific number of carbon atoms, examples include a decyl group having 10 carbon atoms, a lauryl group having 12 carbon atoms, a tridecyl group having 13 carbon atoms, a myristyl group having 14 carbon atoms, a cetyl group having 16 carbon atoms, and an oleyl group and a stearyl group having 18 carbon atoms.

Examples of a specific product include, but are not limited to, NOIGEN series, DSK NL-Dash series, and DKS-NL series manufactured by DKS Co., Ltd., NONION series manufactured by NOF Corporation, EMULGEN series manufactured by Kao Corporation, and LEOX series. LEOCOL series, LIONOL series manufactured by Lion Corporation, as long as the number of carbon atoms represented by $R^1$ among the nonionic surfactants represented by Formula (1) is 10 or more.

The HLB value of the polyoxyalkylene alkyl ether-based surfactant represented by Formula (1) is not particularly limited. Note that the HLB value referred to herein is a value representing the degree of affinity of the surfactant to water and oil (an organic compound insoluble in water), and is defined by the Griffin method (HLB value=20×total amount of formula weight of hydrophilic parts/molecular weight).

Among the nonionic surfactants represented by Formula (1), examples of a specific surfactant having 10 or more carbon atoms represented by $R^1$ and having an HLB value of less than 12.5 include, but are not limited to, NOIGEN XL-41, NOIGEN LF-40X, NOIGEN TDS-30, NOIGEN TDS-50, NOIGEN TDS-70, NOIGEN TDX-50, NOIGEN SD-30, NOIGEN SD-60, DKS NL-15, DKS NL-30, DKS NL-40, DKS NL-50, DKS NL-60, DKS NL-70, NOIGEN ET-83, NOIGEN ET-102, DSK Dash 400, DSK Dash 403, DSK Dash 404, DSK Dash 408, NOIGEN LP-55, NOIGEN LP-70, NOIGEN ET-65, NOIGEN ET-95, NOIGEN ET-115, NOIGEN ET-69, NOIGEN ET-89, NOIGEN ET-109, NOIGEN ET-129, and NOIGEN ET-149 manufactured by DKS Co., Ltd., NONION K-204, PERSOFT NK-60, NONION P-208, NONION P-210, NONION E-202, NONION E-202S, NONION E-205, NONION E-205S, NONION S-202, NONION S-207, NONION EH-204, NONION ID-203, NONION HT-505, NONION HT-507, NONION HT-510, and NONION HT-512 manufactured by NOF Corporation, EMULGEN 102KG, EMULGEN 103, EMULGEN 104P, EMULGEN 105, EMULGEN 106, EMULGEN 108, EMULGEN 210P, EMULGEN 404, EMULGEN 408, EMULGEN 409PV EMULGEN 705, and EMULGEN 707 manufactured by Kao Corporation, and LEOX CL-30, LEOX CL-40, LEOX CL-50, LEOX CL-60, LEOCOL NL-30C, LEOCOL TD-50, LEOCOL TD-70, LEOCOL SC-50, and LEOCOL SC-70 manufactured by Lion Corporation.

In addition, among the nonionic surfactants represented by Formula (1), examples of a specific surfactant in which R1 represents a straight or branched alkyl group or alkenyl group having 10 or more carbon atoms and which has an HLB value of 12.5 or more include, but are not limited to, NOIGEN XL-61, NOIGEN XL-6190, NOIGEN XL-70, NOIGEN XL-80, NOIGEN XL-100, NOIGEN XL-140, NOIGEN XL-160, XL-400D, NOIGEN XL-1000, NOIGEN LF-60X, NOIGEN LF-80X, NOIGEN LF-100X, NOIGEN TDS-80, NOIGEN TDS-100, NOIGEN TDS-120, NOIGEN TDS-200D, NOIGEN TDS-500F, NOIGEN TDX-80, NOIGEN TDX-80D, NOIGEN TDX-100D, NOIGEN TDX-120D, NOIGEN SD-70, NOIGEN SD-80, NOIGEN SD-110, NOIGEN SD-150, DKS NL-80, DKS NL-90, DKS NL-100, DKS NL-110, DKS NL-180, DKS NL-250, DKS NL-450F, DKS NL-600F, NOIGEN ET-160, NOIGEN ET-170, NOIGEN ET-190, DSK Dash 410, NOIGEN LP-80, NOIGEN LP-100, NOIGEN LP-180, NOIGEN ET-135, NOIGEN ET-165, NOIGEN ET-159, and NOIGEN ET-189 manufactured by DKS Co., Ltd., NONION K-220, NONION K-230, NONION K-2100W, PERSOFT NH-90C, PERSOFT NK-100, PERSOFT NK-100C, NONION P-210, NONION P-213, NONION E-212, NONION E-215, NONION E-230, NONION S-215, NONION S-220, NONION B-250, NONION ID-206, NONION ID-209, DISPANOL TOC, NONION HT-515, and NONION HT-518 manufactured by NOF Corporation, EMULGEN 109P, EMULGEN 120, EMULGEN 123P, EMULGEN 130K, EMULGEN 147, EMULGEN 150, EMULGEN 220, EMULGEN 320P, EMULGEN 350, EMULGEN 420, EMULGEN 430, EMULGEN 709, EMULGEN 1108, EMULGEN 1118S-70, EMULGEN 1135S-70, EMULGEN 1150S-60, EMULGEN 4085, EMULGEN 2020G-HA, and EMULGEN 2025G manufactured by Kao Corporation, and LEOX CL-90, LEOX CL-230, LEOCOL TD-90, LEOCOL TD-90D, LEOCOL TDA-90-25, LEOCOL TDN-90-80, LEOCOL TD-120, LEOCOL TD-200, LEOCOL TDA-400-75, LEOCOL SC-80, LEOCOL SC-90, LEOCOL SC-120, LEOCOL SC-150, LEOCOL SC-200, LEOCOL SC-300, and LEOCOL SC-400 manufactured by Lion Corporation.

When $R^1$ in Formula (1) is an octylphenol group, octylphenol ethoxylate is preferred.

Examples of the specific product include, but are not limited to, TRITON (registered trademark) series manufactured by Dow Chemical Co., Ltd., IGEPAL CA series manufactured by Rhodia Co., Ltd., NONIDET P series manufactured by Shell Chemicals Co., Ltd., and NIKKOL OP series manufactured by Nikko Chemicals Co., Ltd.

Specifically, as the amphoteric surfactant, a betaine amphoteric surfactant is preferred, and it is more preferable to contain, for example, an amphoteric surfactant having an alkyl carboxy betaine skeleton or an alkyl amide carboxy betaine skeleton containing at least one compound represented by Formula (2a).

$$R1\text{-}R2\text{-}N^+(CH_3)_2CH_2COO^- \qquad (2a)$$

(In Formula (2a), R1 represents hydrogen or C(=O)R3-NH— (R3 represents a straight or branched alkyl group or alkenyl group), and R2 represents an alkylene group or an alkenylene group).

In Formula (2a), R1 preferably represents a hydrogen atom.

The compound represented by Formula (2a) is preferably an amphoteric surfactant having an alkyl carboxy betaine skeleton represented by Formula (2a-1).

$$C_nH_{2n+1}N^+(CH_3)_2CH_2COO^- \qquad (2a\text{-}1)$$

(In Formula (2a-1), n represents an average addition mole number.)

In Formula (2a-1), n is preferably 8 or more, preferably 10 or more, and preferably 11 or more.

Examples of the specific product corresponding to Formula (2a) include NISSAN ANON BDF (registered trademark)-R, NISSAN ANON BDF (registered trademark)-SF, NISSAN ANON BDC-SF, and NISSAN ANON BDL-SF manufactured by NOF Corporation, AMOGEN CB-H and AMOGEN HB-C manufactured by DKS Co., Ltd., RIKABION B-200 and RIKABION B-300 manufactured by Shin Nippon Rika Co., Ltd., and OBAZOLIN CAB-30 and OBAZOLIN ISAB manufactured by TOHO Chemical Industry Co., Ltd. In addition, examples of the specific product corresponding to Formula (1a-1) include, but are not limited to, AMOGEN S, AMOGEN S-H, and AMOGEN K manufactured by DKS Co., Ltd., AMPHITOL 20BS, AMPHITOL 24B, and AMPHITOL 86B manufactured by Kao Corporation, NISSAN ANON BF, NISSAN ANON BL, and NISSAN ANON BL-SF manufactured by NOF Corporation, RIKABION A-100, RIKABION A-200, and RIKABION A-700 manufactured by Shin Nippon Rika Co., Ltd., and OBAZOLIN LB and OBAZOLIN LB-SF manufactured by TOHO Chemical Co., Ltd.

In addition, the betaine amphoteric surfactant may have an imidazolinium betaine skeleton, and examples of the corresponding specific product include, but are not limited to, NISSAN ANON GLM-R and NISSAN ANON GLM-R-

LV manufactured by NOF Corporation, and AMPHITOL 20Y-B manufactured by Kao Corporation.

In addition, the amphoteric surfactant may be a surfactant represented by the following Formula (2b).

$$R4\text{-}(NHC_2H_4)_{nb}\text{—}N(R5)_2 \qquad (2b)$$

(In Formula (2b), R4 represents a straight or branched alkyl group or alkenyl group, nb represents an integer of 0 to 5, and R5 represents hydrogen, —CH$_2$COONa, or —CH$_2$COOH. The two R5's may be the same as or different from each other, and at least one R5 represents —CH$_2$COONa.)

In Formula (2b), R4 preferably represents a straight alkyl group, and the number of carbon atoms in R4 is preferably 8 or more, preferably 10 or more, and preferably 12 or more.

Examples of the specific product corresponding to Formula (2b) include, but are not limited to, NISSAN ANON LG-R and NISSAN ANON LA manufactured by NOF Corporation.

In addition, the amphoteric surfactant may be an amine oxide surfactant represented by the following Formula (2c).

$$R6\text{-}N^+(CH_3)_2O^- \qquad (2c)$$

(In Formula (2c), R6 represents a straight or branched alkyl group or alkenyl group.)

In Formula (2c), R6 is in Formula (2b), R4 preferably represents a straight alkyl group, and the number of carbon atoms in R4 is preferably 8 or more, preferably 10 or more, and preferably 12 or more.

Examples of the specific product corresponding to Formula (2c) include, but are not limited to, AMOGEN AOL manufactured by DKS Co., Ltd., and AMPHITOL 20N manufactured by Kao Corporation.

Specifically, the cationic surfactant is preferably a cationic surfactant having a quaternary ammonium skeleton, and more preferably a cationic surfactant having a quaternary ammonium skeleton containing at least one compound represented by Formula (3a), for example.

$$R1\text{-}N^+(R2R3)\text{-}R4 \qquad (3a)$$

(In Formula (3a), R1 represents a straight or branched alkyl group or a straight or branched alkenyl group, —CH$_2$— in the alkyl group or alkenyl group may be substituted with —C(=O)—, —NH— or —C(=O)—NH—, R2 and R3 represent a hydrogen atom, a straight or branched alkyl group or a straight or branched alkenyl group, R4 represents a hydrogen atom, a straight or branched alkyl group, a straight or branched alkenyl group or a phenyl group, and —CH$_3$ at the terminal of the alkyl group or alkenyl group may be substituted with a carboxy group or a phenyl group.)

In Formula (3a), in order to further improve the peelability of the ink, R1 is preferably a long-chain alkyl group or alkenyl group, specifically preferably an alkyl group or an alkenyl group having 8 to 30 carbon atoms, preferably an alkyl group having 10 to 25 carbon atoms, and preferably an alkyl group or an alkenyl group having 12 to 22 carbon atoms. The alkyl group or alkenyl group may be straight or branched, preferably straight, and is more preferably a straight alkyl group.

In R1, at least one or more —CH$_2$— in the alkyl group or alkenyl group may be substituted with —C(=O)—, —NH—, or —C(=O)—NH—. Among them, at least one or more —CH$_2$— in the alkyl group or alkenyl group is preferably substituted with —C(=O)—NH— or —NH—C(=O), and one —CH$_2$— in the alkyl group is preferably substituted with —C(=O)—NH— or —NH—C(=O), and more preferably, R1 has an amide propyl skeleton.

R2 and R3 preferably represent a straight or branched alkyl group or a straight or branched alkenyl group, and preferably represent a straight or branched alkyl group. Among them, R2 and R3 preferably represent a straight alkyl group having 1 to 3 carbon atoms, and more preferably represent a methyl group.

R4 preferably represents a straight or branched alkyl group and a straight or branched alkenyl group or a phenyl group, and more preferably represents a straight or branched alkyl group. In addition, —CH$_3$ at the terminal in the alkyl group or alkenyl group is preferably substituted with a carboxy group or a phenyl group.

R4 preferably has 1 to 8 carbon atoms, preferably 1 to 5 carbon atoms, preferably 1 to 3 carbon atoms, and more preferably 1 or 2 carbon atoms.

When R4 represents a methyl group, it is preferable that R2 and R3 also represent a methyl group, and Formula (3a) represents an alkyltrimethylammonium skeleton.

In addition, when R4 represents an ethyl group, it is preferable that —CH$_3$ at the terminal of the ethyl group is substituted with a carboxy group or a phenyl group. That is, it is preferable that R4 represents —CH$_2$—(C(=O)OH or a benzyl group.

The compound represented by Formula (3a) is preferably a cationic surfactant having a quaternary ammonium skeleton represented by Formula (3a-1).

$$C_nH_{2n+1}N^+(CH_3)_2R4 \qquad (3a\text{-}1)$$

(In formula (3a-1), n represents an average addition mole number, and R4 represents the same meaning as that of R4 in Formula (3a) according to claim 3.)

In Formula (3a-1a, the number of carbon atoms represented by n is preferably 8 or more. The more the number of carbon atoms exceeds 8, the more preferred the ink peelability is. Regarding the specific number of carbon atoms, examples include an octyl group having 8 carbon atoms, a nonyl group having 9 carbon atoms, a decyl group having 10 carbon atoms, an undecyl group having 11 carbon atoms, a lauryl group having 12 carbon atoms, a tridecyl group having 13 carbon atoms, a myristyl group having 14 carbon atoms, a pentadecyl group having 15 carbon atoms, a cetyl group having 16 carbon atoms, and an oleyl group and a stearyl group having 18 carbon atoms.

Preferred groups for R4 are the same as those of Formula (3a).

The cationic surfactant having a quaternary ammonium skeleton is preferably a quaternary ammonium skeleton salt type that forms a salt with a halogen, preferably forms a salt with Cl$^-$, more preferably forms a salt with Br$^-$, and still more preferably forms a salt with I$^-$. It is considered that the quaternary ammonium skeleton salt forming a salt with a halogen promotes hydrolysis of the ink film by a nucleophilic action of the halogen, thereby improving the ink peelability.

Among them, alkyltrimethylammonium chloride compounds, dialkyldimethylammonium chloride compounds, and alkylbenzalkonium chloride compounds are preferred.

Examples of the specific product corresponding to Formula (3a) or (3a-1) include, but are not limited to, NISSAN CATION MA NISSAN CATION SA, NISSAN CATION BB, NISSAN CATION FB, NISSAN CATION PB-300, NISSAN CATION ABT2-500, NISSAN CATION AB, NISSAN CATION AB-600, NISSAN CATION VB-M FLAKE, NISSAN CATION VB-F, NISSAN CATION 2-DB-500E, NISSAN CATION 2-DB-800E, NISSAN CATION 2ABT, NISSAN CATION 2-OLR, NISSAN CATION F$_2$-50R, and NISSAN CATION M$_2$-100R manufactured by NOF Corporation, CATIOGEN TML, CATIOGEN TMP, CATIOGEN TMS, CATIOGEN DDM-PG, CATIOGEN BC-50, AND CATIOGEN TBB manufactured by DKS Co., Ltd., QUARTAMIN 24P, QUARTAMIN 86P CONC, QUARTAMIN 60W, QUARTAMIN 86W, SANISOL C, and SANISOL B-50 manufactured by Kao Corporation, and LIPOQUAD C-50, LIPOQUAD T-28, LIPOQUAD T-30, LIPOQUAD T-50, LIPOQUAD T-800, LIPOQUAD 16-29, LIPOQUAD 16-50E, LIPOQUAD 18-63, LIPOQUAD 22-80, LIPOQUAD CB-50, LIPOQUAD 210-80E, LIPOQUAD 2C-75, LIPOQUAD 2HP-75, LIPOQUAD 2HP FLAKE, LIPOQUAD 2HT-75, LIPOQUAD 2HT FLAKE, LIPOQUAD 20-751, LIPOQUAD 41-50, TMAC-50, TPAH-40, TBAB-50A, TBAB-100A, TBAH-40, LIPOQUAD PH-100, BTMAC-50, BTMAC-100A, BTEAC-50, BTEAC-100A, and BTBAC-50A manufactured by Lion Corporation.

In addition, the cationic surfactant preferably contains at least one compound represented by primary to secondary alkanolamine skeletons, and preferably contains at least one compound represented by a monoalkanolamine skeleton.

The primary monoalkanolamine is preferably a lower alkanol having 1 to 4 carbon atoms, and specific examples thereof include monoethanolamine and 2-aminoisobutanol. Examples of the secondary monoalkanolamine include N-methylethanolamine, 2-ethylaminoethanol, and isopropanolamine. Substances other than those exemplified can also be used as appropriate. In addition, these monoalkanolamine-based compounds can be used alone or in combination of two or more thereof as appropriate, and can also be used by mixing with water.

The cationic surfactant having a monoalkanolamine skeleton is preferably a monoalkanolamine salt type that forms a salt with a halogen, and preferably forms a salt with Cl$^-$.

These surfactants may be used alone or in combination of two or more thereof. The adding amount is preferably 5 wt % or less, and preferably 2 mass % or less, based on the total amount of the deinking agent. The lower limit value of the surfactant is not particularly limited, and may be 0 mass %. When the surfactant is contained, the surfactant is preferably 0.1 mass % or more.

(Temperature)

In the invention, the temperature of the deinking agent, that is, the liquid temperature is not particularly limited. The higher the cleaning effect of the deinking agent is, the higher the liquid temperature is. Therefore, the liquid temperature is preferably 30° C. or higher, preferably 40° C. or higher, and preferably 50° C. or higher. The upper limit of the liquid temperature is not particularly limited as long as the liquid state is maintained. Generally, 90° C. or lower is preferred.

On the other hand, when the plastic substrate is crushed in the deinking agent, in order to more finely crush the plastic substrate, the liquid temperature is preferably 40° C. or lower, preferably 30° C. or lower, and preferably 20° C. or lower because the liquid temperature is preferably not too high. As the crushability is higher, the ink peelability is improved.

From the above, the liquid temperature may be adjusted in consideration of the peelability effect of the deinking agent and the crushability of the plastic substrate, and specifically, the deinking agent is preferably used in a range of 10° C. to 70° C.

(Peeling Device)

A device and method in the step of peeling off the ink layer using the deinking agent are not particularly limited, and specific examples thereof include a device including a motor with stirring blades capable of stirring the deinking agent in a container, a device including a device for generating ultrasonic waves, and a device capable of strongly shaking each container. In addition, when the deinking and the crushing of the plastic substrate are simultaneously performed, a wet crusher, a colloid mill, a crushing mill, and the like can be exemplified.

(Wet Crusher)

One example of the wet crusher for use in the deinking method according to the invention is a wet crusher capable of simultaneously crushing, dispersing mixing, and press-feeding a solid matter in a liquid. Specifically, a crusher having a mechanism for crushing a solid matter in a liquid by a shearing force and/or a frictional force is preferred, and a crusher having a mechanism capable of crushing and press-feeding a plastic substrate is preferred. Examples of such a wet crusher include a wet crushing pump, a colloid mill, and a crushing mill.

(Wet Crushing Pump)

The wet crushing pump for use in the invention preferably has a mechanism for crushing a solid matter in a liquid by a fixed blade and a rotary blade while press-feeding the solid matter, and more preferably a mechanism for crushing the solid matter in three stages by a combination of four components including a cutting blade, a crushing impeller, a shroud ring, and a grid.

The plastic substrate is crushed in three stages by the wet crushing pump. The plastic substrate is roughly cut by a cutting blade of the fixed blade and an edge at an entrance of the crushing impeller of the rotary blade, and is then stirred and press-fed by an axial flow type crushing impeller, and a part of the plastic substrate comes into contact with and is cut by a blade portion of the shroud ring of the fixed blade. A laminated film that passes through the crushing impeller is further crushed and stirred in the grid, passes through the grid, is pressurized by a pressurizing impeller, and is press-fed to the next step.

The press feeding speed is not particularly limited, and is preferably 0.03 m$^3$/min or more in consideration of the peeling of the ink layer and the peeling and separation efficiency when a plastic laminate in which the plastic substrate is laminated is separated into layers. The upper limit of the press feeding speed is not particularly limited, and even at a standard operation speed of a device, for example, 1.4 m$^3$/min, the ink layer can be sufficiently peeled off and the plastic laminate can be sufficiently separated into single layers.

The grid shape is not particularly limited. Since the grid diameter is involved in the size of the laminated film after crushing, the grid diameter is preferably 0.1 mm to 50 mm, and more preferably 1 mm to 20 mm in consideration of the crushing efficiency and the size of the laminated film after crushing.

Examples of the specific wet crushing pump include KD series manufactured by Husqvarna Zenoah, SUNCUTTER series manufactured by Nikuni Corporation, Disintegrator series manufactured by FURUKAWA INDUSTRIAL MACHINERY SYSTEMS Co., Ltd., INCRUSHER series manufactured by AIKAWA Iron Works Co., Ltd., and SCATTER manufactured by SANWA HYDROTECH Corporation.

(Colloid Mill)

The colloid mill for use in the invention is a machine used to reduce the particle size of particles in a dispersion system in which the particles float in a liquid. The colloid mill includes a combination of a rotor and a stator, and the rotor rotates at a high speed with respect to the fixed stator. The colloid mill is used to reduce the particle size of the particles in the liquid by high-level shearing generated by high-speed rotation.

A crushing unit in the colloid mill includes a combination of a tooth-shaped truncated cone-shaped rotor and a stator, and the rotor and the stator each have a tapered shape that becomes narrower toward a dispensing port. The plastic substrate is repeatedly subjected to strong shearing, compression, and impact in a ring-shaped gap that becomes narrower toward the dispensing port, and is crushed.

The specific colloid mill is not particularly limited as long as it is a disperser generally referred to as a colloid mill, and examples thereof include COLLOID MILL MK series manufactured by IKA Co., Ltd., WCM series manufactured by IWAKI Co., Ltd., PUC COLLOID MILL series manufactured by Mountech Co., Ltd., and CAVITRON manufactured by EUROTECH Co., Ltd.

(Crushing Mill)

The crushing mill for use in the invention is a machine used for crushing a solid matter in a system in which the solid matter floats in a liquid, and has a function and appearance of a food processor. The crushing mill referred to herein is used to reduce the solid matter size in the liquid by high-level shearing generated by high-speed rotation of a rotary blade.

The specific crushing mill is not particularly limited as long as it is a machine which is a batch type and in which a solid matter can be charged into a liquid and the solid matter can be crushed by a rotary blade. Examples of the specific crushing mill include MultiDrive series manufactured by IKA Co., Ltd., and Mighty Blender series, Waring series, and Blender series manufactured by Osaka Chemical Co., Ltd.

By crushing the plastic laminate in a cleaning agent using the above wet crusher, the plastic laminate in which different types of plastics are laminated can be separated into single layer films and a plastic substrate. In addition, since most of the plastic laminate is provided with a printing ink film for displaying a product name and the like and imparting decoration in addition to an adhesive, in the plastic laminate provided with the ink layer, the ink layer can be more efficiently peeled off and removed by crushing the plastic laminate in the deinking agent. Accordingly, by crushing the plastic laminate during peeling, the peeling and removal of the ink layer provided on the plastic laminate and the single layer separation of the plastic laminate can be simultaneously performed. Therefore, even in a laminate structure in which the ink layer is not present in the outermost layer and the ink film is provided between two or more types of plastic substrates, the ink layer can be peeled off and removed by a simple process. For example, the most frequently used ink for plastic laminated films including those for food packaging is a gravure ink or a flexo ink, and in the wet crushing step using a deinking agent, the printing ink layer can also be peeled off. In addition, a metal foil such as aluminum or a vapor deposition film may be laminated on the laminated film, and in the invention, the metal foil or the vapor deposition film can also be peeled off or dissolved.

(Recovery Device)

A device and a method for recovering the ink layer and the plastic substrate after peeling off the ink layer are not particularly limited. For example, a filter, a centrifugal separator, an automatic raking bar screen, an inclined wire screen, and a rotary drum screen can be used.

(Plastic Substrate Having Ink Layer)

The plastic substrate having the ink layer for use in the deinking method according to the invention is not particularly limited as long as the ink film adheres to the plastic substrate. The ink layer is a printing ink obtained by printing with an organic solvent-based printing ink or an aqueous type or active energy ray-curable ink using, for example, a gravure printing machine, a flexographic printing machine, an offset printing machine, and an inkjet printing machine. A multicolor printing ink layer using a plurality of ink types may be used.

The type of the ink is not particularly limited, and the ink layer can be peeled off regardless of the type of the ink by using the deinking agent according to the invention. In order to allow the deinking agent according to the invention to contain an inorganic base such as sodium hydroxide or potassium hydroxide, an ink containing a weakly basic resin, for example, an ink containing nitrocellulose in a resin used in an ink or an ink containing an oxidized resin is preferred since it is more easily peeled off.

The plastic substrate is not particularly limited in material, shape, and the like, and may have a single-layer structure or a plastic laminate in which different types of plastics are laminated.

(Plastic Laminate)

The plastic laminate for use in the deinking method according to the invention is a plastic laminate having at least two or more layers, and is a laminate in which a plurality of layers such as an ink layer, an adhesive layer, another plastic layer, a vapor deposition film layer, and a metal foil layer are laminated on a plastic substrate. Such a laminate is not particularly limited, and examples thereof include a laminated film obtained by lamination and adhesion with a reactive adhesive used for food packaging and household goods. Of course, a laminated film obtained by lamination and adhesion with a non-reactive adhesive, for example, a thermoplastic resin adhesive, and a laminated film obtained by thermal fusion by using an extrusion lamination method can also be separated and recovered into single layer films and the ink layer can be peeled off by the deinking method according to the invention. In addition, a laminate having a sheet shape or a container shape may be used.

In addition, for example, in a container such as a PET bottle, a shrink label which is a laminated film formed in a cylindrical shape is used in order to display a product name and the like and impart decoration. During recycling, the consumer peels off the shrink label and separately discards the PET bottle body and the shrink label. However, in the deinking method according to the invention, even in a state where the PET bottle body and the shrink label are integrated with each other, the ink layer can be peeled off and recovered. In particular, when a wet crusher is used, the shrink label can be separated from the PET bottle body and the shrink label can be separated into single layer films together with the deinking.

In the laminated film obtained by lamination and adhesion with a reactive adhesive, an adhesive layer made of the reactive adhesive is often laminated between at least two resin film layers, or between the plastic substrate and a metal foil or vapor deposition film layer. Specifically, in the laminated film, when the resin film layer is represented as (F), the metal foil layer of the metal foil or vapor deposition film layer is represented as (M), and the adhesive layer made of the reactive adhesive is represented as (AD), the following configuration can be considered as specific aspects of the laminated film, while of course, the invention is not limited thereto.

(F)/(AD)/(F),
(F)/(AD)/(F)/(AD)/(F),
(F)(AD)/(M)/(AD)/(F),
(F)/(AD)/(M),
(F)/(AD)/(M)/(F),
(F)/(AD)/(F)/(AD)/(M)/(AD)/(F),
(F)/(AD)/(M)/(AD)/(F)/(AD)/(F),
(M)/(AD)/(M),
(M)/(AD)/(F)/(AD)/(M),
(AD)/(F)/(AD)/(M),
(AD)/(F)/(AD)/(F)/(AD), and the like.

The plastic laminate for use in the deinking method according to the invention has a configuration in which the ream film layer has an ink layer. The location where the ink layer is provided is not particularly limited. For example, the ink layer may be provided on the outermost layer of the laminated film, or may be provided between the resin film layer (F) and the adhesive layer (AD). In the case where the ink layer is provided between the resin film layer (F) and the adhesive layer (AD) (back printing), the ink layer and the adhesive layer are more firmly bonded to each other, so that it is more difficult to peel off the ink layer. According to the method of the invention, the ink layer can be effectively peeled off even in the configuration of back printing. Among them, by crushing the plastic laminate in the deinking agent, the peeling of the ink layer and the separation of layers constituting the plastic laminate can be performed simultaneously.

The laminated film may further include a paper layer, an oxygen absorbing layer, an anchor coat layer, and a primer layer for removal for facilitating deinking.

The resin film layer (F) functions as a substrate film layer (F1), a sealant layer (F2) serving as a heat-sealed portion when a packaging material is formed, and the like when classified according to a required role.

Examples of the resin film to be the substrate film layer (F1) include: polyolefin-based films such as low-density polyethylene, high-density polyethylene, linear low-density polyethylene, biaxially stretched polypropylene (OPP), and non-stretched polypropylene (CPP); polyester-based films such as polyethylene terephthalate (PET) and polybutylene terephthalate; polyamide-based films such as nylon 6, nylon 6,6, and meta-xylene adipamide (N-MXD6); biodegradable films such as polylactic acid; polyacrylonitrile-based films; poly(meth)acrylic films; polystyrene-based films; polycarbonate-based films, ethylene-vinyl acetate copolymer saponified product (EVOH)-based films; polyvinyl alcohol-based films; and films containing these pigments of K coat such as polyvinylidene chloride. Transparent vapor deposition films obtained by vapor depositing alumina, silica, and the like on these films may also be used.

In addition, the surface of the film material may be subjected to various surface treatments such as a flame treatment, a corona discharge treatment, and a chemical treatment using a primer and the like.

As such a substrate, since a polyester-based film such as PET is easily dissolved in the deinking agent according to the invention, a configuration in which the polyester-based film is provided in the plastic laminate is effective for the deinking and the single layer separation and recovery of the plastic film. For example, a plastic laminate such as PET/INK/AD/CPP has a configuration of back printing and includes different types of plastic films, and therefore has a configuration in which the deinking and the single layer separation and recovery of the plastic film are difficult, but regardless of this, the deinking and the CPP recovery can be easily performed by dissolving PET.

A flexible polymer film to be the sealant layer (F2) is preferably a polyethylene film, a polypropylene film, a polyolefin-based film such as an ethylene-vinyl acetate copolymer, or films of an ionomer resin, an EAA resin, an EMAA resin, an EMA resin, an EMMA resin, and a biodegradable resin. The general-purpose name includes a non-stretched polypropylene (CPP) film, a vacuum-metallized cast polypropylene (VMCPP) film, a linear low-density polyethylene (LLDPE) film, a low-density polyethylene (LDPE) film, a high-density polyethylene (HDPE) film, a vacuum-metallized low-density polyethylene (VMLDPE) film, or a film containing these pigments. The surface of the film may be subjected to various surface treatments such as a flame treatment, a corona discharge treatment, and a chemical treatment using a primer and the like.

Examples of the metal foil layer (M) include a metal foil having excellent spreadability, such as gold, silver, copper, zinc, iron, lead, tin, an alloy thereof, steel, stainless steel, and aluminum. Since the metal foil layer (M) is easily dissolved in the deinking agent according to the invention, a configuration having the metal foil layer (M) in the plastic laminate is effective for the deinking and the single layer separation and recovery of the plastic film.

Examples of the paper layer include natural paper and synthetic paper. First and second sealant layers may be formed of a material same as that of the sealant layer described above.

Another layer may contain a known additive or stabilizer, for example, an antistatic agent, a non-reactive adhesive layer, an easy-adhesion coating agent, a plasticizer, a lubricant, or an antioxidant.

For the ink film peeling method and the plastic substrate recovery method according to the invention, an example of a specific embodiment will be described in detail.

(Step 1: Ink Layer Peeling Step)

First, the plastic film provided with the ink layer is immersed in the deinking agent. The immersion time is often within a range of 60 minutes. Note that in the invention, it is not necessary to completely peel off the ink layer from the film by 100%, and a certain amount of the ink film may remain on the film as long as the film is recovered in a step 2 described later and is not inconvenient in the subsequent recycling step. Specifically, 75 wt % or more of the ink film may be peeled off from the plastic film.

In the step 1, the number of times of immersion in the deinking agent may be one or several times. After the immersion is performed once, the step 2 of recovering the separated film may be performed, or after the immersion is performed several times, the step 2 may be performed. In addition, when a plurality of times of the immersion is performed in the step 1, the type or concentration of the deinking agent may be changed. In addition, known steps such as water washing, draining, dehydration, and drying may be appropriately added between these steps.

In the step 1, it is preferable to crush the plastic film in the deinking agent using the wet crusher described above. By the crushing, the plastic film is easily peeled off, so that the peelability of the ink layer is improved. In addition, in a case of a film subjected to back printing, each laminated layer is easily separated into single layers by crushing the film, and the peeling of the ink layer is also promoted.

(Step 2: Separated Film Recovery Step)

Most of the ink layer separated from the film is not dissolved in the deinking agent and becomes a residue in the deinking agent. That is, in the deinking agent in the step 1, the peeled film and the residue such as a printing ink float.

The peeled film and the residue are taken out from the cleaning liquid, and then the plastic film is classified and recovered.

As a specific example of the method, for example, in floatation selection, plastics having a low specific gravity such as polyolefins such as polypropylene or polyethylene (floats), condensation synthetic films such as polyesters or nylon having a specific gravity higher than that of the polyolefin, or mass substances such as a metal foil are selected, the mass substances are removed, then the recovered plastics are cleaned and dehydrated in a cleaning and dehydrating step, and the plastics having different specific gravities are classified by centrifugation. For example, the plastics can be divided into a plastic separated material containing a vinyl chloride resin, polyethylene terephthalate, and the like having a specific gravity of 1 or more sinking in water, and a plastic separated material containing an olefin-based resin such as polyethylene or polypropylene not containing a vinyl chloride resin.

Further classification can be performed by changing the specific gravity by appropriately changing the mixing ratio in the liquid for use in the floating selection, such as water and an organic solvent or a salt.

(Step 3: Cleaning Solution Recovery and Reuse)

The deinking agent for use in the steps 1 and 2 is supplied to any one or more cleaning agent recycling machines selected from a filter, a centrifugal separator, and an ultrafiltration machine in order to recover the deinking agent, and is reused after the solid matter and the concentrate of the residue are removed. While the ink layer peeling step and the specific gravity separation step are performed in the steps 1 and 2, a cleaning agent reuse step can be continuously operated to separate the solid matter and the concentrate of the residue from the deinking agent.

(Step 4: Film Drying)

After collecting various films separated in the step 2, the films are dried by any one or more selected from vacuum heat drying, hot air drying, and pressure compression drying in order to remove the residual moisture. These can be used in combination. As a pretreatment for preparing recycled pellets in step 5, briquettes may be prepared using a pressure compressor such as a briquette machine after or during drying of the films.

(Step 5: Recycled Pellet Preparation)

The film pieces or briquettes dried in the step 4 are charged into a uniaxial and biaxial kneading machine to prepare the recycled pellets. The kneading conditions are not particularly limited, and the kneading machine is preferably operated at 180° C. to 280° C. in order not to remarkably deteriorate the resin performance before recycling.

The deinking agent for use in the invention contains an inorganic base and a water-soluble solvent capable of dissolving the inorganic base. In the water-soluble solvent, hydroxide ions generated from the inorganic base are not hydrated, and thus the nucleophilic property is increased, which is effective in peeling off the ink film. In addition, since the water-soluble solvent has a low polarity, it is considered that the reaction of peeling off the ink layer is further progressed in the hydrophobic environment.

EXAMPLES

Hereinafter, the contents and effects of the invention will be described in more detail with reference to Examples. In addition, films, printing inks, reactive adhesives, and organic solvents used as materials in Examples and Comparative Examples are shown below.

(Films for Use in Laminated Film)
OPP: biaxially stretched polypropylene film, 20 μm
CPP: non-stretched polypropylene film, 35 μm
VMCPP: vacuum-metallized cast polypropylene film, 25 μm
PET: polyethylene terephthalate film, 12 μm (Printing Ink)
INK1: FINART R507 Cyan (manufactured by DIC Graphics Corporation)
INK2: two-component curing type ink containing FINART R794 White G3 (manufactured by DIC Graphics Corporation) and curing agent CVL Hardener #10 (manufactured by DIC Corporation)

(Reactive Adhesive)
AD1: two-component type adhesive (ether-based adhesive) containing solvent-type adhesives DICDRY LX-470EL and SP-60 (manufactured by DIC Corporation)
AD2: two-component type adhesive (ester-based adhesive) containing solvent-free adhesives DICDRY 2K-SF-400A and HA-400B (manufactured by DIC Corporation)

(Method for Preparing Laminated Film)

The laminated film was prepared by performing printing on a target film by the following printing method and then bonding the target film by the following laminating method. A layer configuration of the film and the types of the reactive adhesive and the printing ink were used according to the combinations shown in Table 1.

(Printing Method)

The gravure ink, i.e., a printing ink, was color-developed into a film "Film1" using a proofer.

(Laminating Method)

A reactive adhesive "AD" was applied by a laminator to a color-developed surface of the printing ink of the film "Film1" in which the printing ink was color-developed so as to have a coating amount of 3 g/m$^2$ in terms of solid content, and a film "Film2" was bonded to the film "Film1". The laminated film thus bonded was subjected to an aging reaction at 40° C. for 72 hours. Laminated films "LAM1" to "LAM4" shown in Table 1 were obtained. Note that blank columns indicate that there is no configuration.

TABLE 1

| Configuration of laminated film | Film1 | Ink1 | Ink2 | Ad | Film2 |
|---|---|---|---|---|---|
| LAM1 | OPP | INK1 | | | |
| LAM2 | OPP | INK1 | INK2 | | |
| LAM3 | OPP | INK1 | INK2 | AD1 | VMCPP |
| LAM4 | OPP | INK1 | INK2 | AD2 | VMCPP |
| LAM5 | PET | INK1 | INK2 | AD1 | CPP |

The laminated films "LAM1" to "LAM4" were each cut into a size of 2 cm×6 cm to obtain a test piece.

(Cleaning Step)
PRO1: the test piece was gently immersed in the cleaning agent for 30 minutes.
PRO2: a homodisper was used and the mixture was stirred at 200 rpm for 10 minutes.
PRO3: SUNCUTTER C125H manufactured by Nikuni Corporation was used and the mixture was press-fed at 0.1 m$^3$/min.

(Ink Cleaning Agent)

Water, 0.3 wt % of the surfactant shown in Table 2, the water-soluble solvent shown in Table 3, and 2 wt % of potassium hydroxide were mixed to prepare the ink cleaning agent shown in Table 4.

TABLE 2

| Surfactant | Item number | Structure | Manufacturer |
|---|---|---|---|
| SUR1 | NONION E-215 | Nonionic surfactant | NOF Corporation |
| SUR2 | AMOGEN S-H | Amphoteric surfactant | DKS Co., Ltd. |
| SUR3 | M2-100R | Cationic surfactant | NOF Corporation |

TABLE 3

| Water-soluble solvent | Compound name |
|---|---|
| SOL1 | Ethanol |
| SOL2 | 3-methoxy-3-methyl-1-butanol |
| SOL3 | Diethylene glycol monobutyl ether |

When water and 2 wt % of potassium hydroxide were mixed, ○ was shown in Table 4.

When 0.3 wt % of the surfactant was blended, the product name was shown in Table 4.

When the water-soluble solvent was mixed, the type was shown in the upper row and the blending weight % was shown in the lower row.

When not blended, "–" was shown.

The composition of the ink cleaning agent in Table 4 was added with water to make up 100 wt % in a longitudinal direction.

TABLE 4

| Ink cleaning agent | ABS1 | ABS2 | ABS3 | ABS4 | ABS5 | ABS6 |
|---|---|---|---|---|---|---|
| Potassium hydroxide | ○ | ○ | ○ | ○ | ○ | ○ |
| Surfactant | — | — | SUR2 | SUR3 | SUR1 | — |
| Water-soluble solvent | SOL1 | SOL2 | SOL3 | SOL1 | SOL3 | SOL1 |
|  | 98% | 98% | 97% | 40% | 97% | 20% |
| Water | — | — | ○ | ○ | ○ | ○ |

TABLE 5

| Ink cleaning agent | ABS7 | ABS8 | ABS9 | ABS10 |
|---|---|---|---|---|
| Potassium hydroxide | ○ | ○ | ○ | — |
| Surfactant | — | SUR1 | — | — |
| Water-soluble solvent | — | — | SOL1 | SOL1 |
|  |  |  | 15% | 100% |
| Water | ○ | ○ | ○ | — |

(Ink Removability from Laminated Film)

The result 1 in Tables 4 and 5 indicates an ink removal state from the laminated film. After the laminated film was cleaned and dried in the cleaning step, the ink removability of a printed portion was determined by calculating an area by image processing a photograph taken using an optical microscope and obtaining the ink removal rate using the following equation.

Ink removal rate (%)=(1−ink adhesion area after cleaning/ink adhesion area before cleaning)×100

A: 100% of the printed portion is removed.
B: 75% or more and less than 100% of the printed portion is removed.
C: 50% or more and less than 75% of the printed portion or the laminated portion is removed.
D: No peeling occurs at all, and less than 50% is removed.

Note that "A", "B", and "C" are in a range in which there is no problem in practical use.

Evaluation results are summarized and shown in Tables 6 to 9.

TABLE 6

| Example | Example 1 | Example 2 | Example 3 | Example 4 | Example 5 | Example 6 | Example 7 |
|---|---|---|---|---|---|---|---|
| Configuration of laminated film | LAM1 | LAM2 | LAM3 | LAM4 | LAM2 | LAM3 | LAM3 |
| Composition of cleaning agent | ABS1 | ABS1 | ABS1 | ABS1 | ABS1 | ABS1 | ABS2 |
| Cleaning step | PRO1 | PRO1 | PRO1 | PRO1 | PRO2 | PRO3 | PRO3 |
| Cleaning liquid temperature | 70° C. | 70° C. | 70° C. | 70° C. | 70° C. | 30° C. | 30° C. |
| Result 1 | A | B | C | C | A | B | B |

TABLE 7

| Example | Example 8 | Example 9 | Example 10 | Example 11 | Example 12 | Example 13 | Example 14 |
|---|---|---|---|---|---|---|---|
| Configuration of laminated film | LAM3 | LAM3 | LAM2 | LAM3 | LAM1 | LAM1 | LAM5 |
| Composition of cleaning agent | ABS3 | ABS4 | ABS1 | ABS5 | ABS6 | ABS4 | ABS1 |
| Cleaning step | PRO3 | PRO3 | PRO3 | PRO3 | PRO3 | PRO1 | PRO2 |
| Cleaning liquid temperature | 30° C. | 30° C. | 70° C. | 70° C. | 20° C. | 70° C. | 70 |
| Result 1 | B | B | A | B | C | B | A |

TABLE 8

| | Comparative Example | | | | |
|---|---|---|---|---|---|
| | Comparative Example 1 | Comparative Example 2 | Comparative Example 3 | Comparative Example 4 | Comparative Example 5 |
| Configuration of laminated film | LAM1 | LAM1 | LAM1 | LAM3 | LAM4 |
| Composition of cleaning agent | ABS9 | ABS10 | ABS7 | ABS7 | ABSS |
| Cleaning step | PRO1 | PRO1 | PRO1 | PRO3 | PRO3 |
| Cleaning liquid temperature | 70° C. | 70° C. | 70° C. | 70° C. | 70° C. |
| Result 1 | D | D | D | D | D |

From this result, in the example using the deinking agent containing 20 mass % or more of the water-soluble solvent and the inorganic base, the peeling of the ink layer was easily achieved. As shown in Examples 1 to 5, the peelability could be obtained only by immersing in PRO1. In addition, from PRO3, it was found that when the laminated film was crushed, the configuration of LAM4 or LAM5 exhibited more excellent peelability.

The invention claimed is:

1. A deinking method comprising:
  providing a plastic substrate comprising a plastic film and an ink layer formed on the plastic film;
  providing a deinking agent comprising (a) 20 mass % or more of a water-soluble solvent and (b) 0.1 mass % to 10 mass % of an inorganic base;
  providing a crusher capable of simultaneously crushing and press-feeding;
  preparing a matter comprising the plastic substrate and the deinking agent;
  a step of peeling off and removing the ink layer from the plastic substrate in the crusher while the matter is simultaneously crushed and press-fed into the crusher.

2. The deinking method according to claim 1, wherein the water-soluble solvent is a water-soluble alcohol or a water-soluble solvent having a flash point of 21° C. or higher.

3. The deinking method according to claim 1, wherein the deinking agent further contains at least one of (c) and (d),
  (c) water contained in an amount of 80 mass % or less based on a total amount of the deinking agent, and
  (d) a surfactant contained in an amount of 5 mass % or less based on the total amount of the deinking agent.

4. The deinking method according to claim 1, wherein the plastic substrate is a laminate comprising:
  the ink layer;
  layers comprising the plastic film;
  and optionally, an additional layer selected from a metal foil layer, and a vapor deposition film layer,
  wherein the ink layer is between the layers.

5. The deinking method according to claim 1, wherein in the step of peeling off and removing the ink layer from the plastic substrate, the plastic substrate is separated into single layers and the ink layer is peeled off and removed from the plastic substrate while the plastic substrate is crushed in the deinking agent by performing press feeding simultaneously with crushing.

6. A plastic substrate recovery method comprising:
  recovering the plastic substrate from which the ink layer is peeled off by the deinking method according to claim 1.

* * * * *